(12) United States Patent
Tam et al.

(10) Patent No.: US 10,331,008 B1
(45) Date of Patent: Jun. 25, 2019

(54) BEAM-STEERING APPARATUS WITH FAST RESPONSE AND ENHANCED STEERING RESOLUTION

(71) Applicant: Hong Kong Applied Science and Technology Research Institute Company Limited, Hong Kong (HK)

(72) Inventors: Ming Wai Alwin Tam, Hong Kong (HK); Xiuling Zhu, Hong Kong (HK); Kin Lung Chan, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 15/910,050

(22) Filed: Mar. 2, 2018

(51) Int. Cl.
*G02F 1/29* (2006.01)

(52) U.S. Cl.
CPC ............ *G02F 1/29* (2013.01); *G02F 2203/07* (2013.01); *G02F 2203/24* (2013.01)

(58) Field of Classification Search
CPC ..... G02F 1/29; G02F 2203/07; G02F 2203/24
USPC ........................................................ 359/304
See application file for complete search history.

(56) References Cited

U.S. PATENT DOCUMENTS

| 7,572,013 | B2 | 8/2009 | Kawaai |
| 7,686,453 | B2 | 3/2010 | Bruzzone |
| 9,575,366 | B2 | 2/2017 | Srivastava et al. |
| 2012/0188467 | A1 | 7/2012 | Escuti et al. |
| 2012/0218464 | A1 | 8/2012 | Ben-Moshe et al. |
| 2016/0154247 | A1* | 6/2016 | Liu ...................... G02B 6/2766 349/193 |
| 2017/0160352 | A1 | 6/2017 | Kornack et al. |

FOREIGN PATENT DOCUMENTS

| CN | 104011582 A | 8/2014 |
| CN | 1588180 A | 3/2015 |
| CN | 104460020 A | 3/2015 |
| KR | 20040020345 A | 3/2004 |

OTHER PUBLICATIONS

International Search Report and Written Opinion of PCT application No. PCT/CN2018/077894 issued from the International Search Authority dated Nov. 28, 2018.

* cited by examiner

*Primary Examiner* — Wen Huang
(74) *Attorney, Agent, or Firm* — Spruson & Ferguson (Hong Kong) Limited (57) ABSTRACT

A device for controllably deflecting a first circularly-polarized (CP) light beam from an incident direction with fast response comprises a polarization selector (PS) to adjust the incident light beam's sense of rotation to a desired one to form a second CP light beam, and a polarization grating (PG) to deflect the second CP light beam according to the desired sense of rotation. The PS comprises an optical modulator sandwiched between two quarter-wave plates. The optical modulator has at least one ferroelectric liquid crystal (FLC) half-wave plate (HWP) being reconfigurable in fast axis orientation. The device has a fast response in beam steering due to a short time of reconfiguring the FLC HWP. Based on serially cascading multiple units each being this device, a beam-steering apparatus having fast response and enhanced steering resolution is obtained. The apparatus is usable for enhancing a field of view in projecting an image.

20 Claims, 8 Drawing Sheets

| Electrical signal 161 | Fast axis of 1st FLC HWP 130 |
|---|---|
| −Vp | First orientation 131 |
| +Vp | Second orientation 133 |

BEAM-STEERING APPARATUS WITH FAST RESPONSE AND ENHANCED STEERING RESOLUTION

LIST OF ABBREVIATIONS 3D three-dimensional
CP circularly-polarized
DC direct current
DMD digital micromirror device
DOE diffractive optical element
EO electro-optical
FLC ferroelectric liquid crystal
FOV field of view
H horizontal
HWP half-wave plate
IR infrared
LC liquid crystal
LCoS a liquid crystal on silicon
LH left hand
LP linearly-polarized
PG polarization grating
PS polarization selector
QWP quarter-wave plate
RH right hand
SLM spatial light modulator
V vertical

FIELD OF THE INVENTION

The present application generally relates to an apparatus for non-mechanically steering an optical beam. In particular, the present invention relates to a beam-steering apparatus based on using plural beam-deflecting devices for increasing a resultant steering resolution where each of the beam-deflecting devices employs at least one FLC HWP for providing fast response time.

BACKGROUND

Non-mechanical steering of an optical beam is useful for many applications such as increasing the FOV in holographic projection. A PG can be used to non-mechanically steering the optical beam or an optical image. Theoretical and implementation aspects of the PG can be found in, e.g., "Polarization Gratings for Non-Mechanical Beam Steering Applications" authored by J. Buck et al. and published in *Proceedings of SPIE 8395, Acquisition, Tracking, Pointing, and Laser Systems Technologies XXVI*, 83950F (15 May 2012), the disclosure of which is incorporated by reference herein. The PG deflects a CP light beam by a deflection angle to a traveling direction of the CP light beam. The deflection is to the left side or the right side of the traveling direction. Whether the left or right side is selected in light deflection is determined according to the sense or rotation, or handedness, of the CP light beam.

However, there is a need for improvement in the PG regarding its steering resolution and response time. The steering resolution is generally poor as the PG offers a fixed deflection angle. The PG's response time of switching the light beam from the left side to the right side or vice versa, usually around 10 ms per steer, is relatively shorter than many other beam-steering devices such as a liquid prism. Despite this, a shorter response time, e.g., a sub-millisecond response time, is required for a number of practical applications such as tracking a fast-moving object and then spotlighting it in a radar application.

US2012/0188467 addresses the issue of poor resolution by disclosing a beam-steering device realized with a serial cascade of multiple units each being a PS followed by a PG. Each unit, with the PS thereof realized by nematic LC, is electronically controllable to deflect an incoming light beam or maintain its traveling direction by using an electric field to control orientation of LC molecules in the PS. By controlling an actual deflection angle in each unit, a plurality of achievable deflection angles is obtained so that the steering resolution is increased. Although the steering resolution is improved, the response time in beam steering is not shortened.

U.S. Pat. No. 9,575,366 discloses a FLC switch that is capable of fast switching and low-cost manufacturing, and claims that this switch is useful for implementing a diffraction grating. The disclosed switch includes a pair of crossed polarizers, causing no deflection of the incident beam when the disclosed FLC switch is switched on. Although the FLC switch of U.S. Pat. No. 9,575,366 provides fast switching and the multistage arrangement used in the beam-steering device of US2012/0188467 improves the beam steering resolution, applying the FLC switch of U.S. Pat. No. 9,575,366 to implement the PS in each unit of the beam-steering device of US2012/0188467 does not result in a workable PG having an improved steering resolution and a fast response time since the FLC switch is basically an on-off switch.

There is a need in the art for a new design of a beam-steering device that provides an improved steering resolution and a fast response time.

SUMMARY OF THE INVENTION

A first aspect of the present invention is to provide a device for controllably deflecting a first CP light beam from an incident direction with an advantage that the device provides a fast response in beam steering.

The beam-deflecting device comprises a PG for receiving a second CP light beam generated from the first CP light beam and deflecting the received second CP light beam from the incident direction by a deflection angle to a left side or a right side of the incident direction. The second CP light beam has a second sense of rotation. Selection of the left or right side in deflecting the second CP light beam is determined according to the second sense of rotation.

The device further comprises a PS for controllably maintaining or reversing the first sense of rotation of the first CP light beam to generate the second CP light beam that possesses the second sense of rotation. The PS comprises a first QWP, an optical modulator and a second QWP. The first QWP is used for transforming the first CP light beam to a first LP light beam. The first LP light beam has a first polarization orientation. The first QWP is arranged such that the first sense of rotation determines the first polarization orientation. The optical modulator is used for adjusting the first polarization orientation of the first LP light beam to a second polarization orientation so as to form a second LP light beam having the second polarization orientation. The second QWP is used for transforming the second LP light beam to the second CP light beam. The second QWP is arranged such that the second polarization orientation determines the second sense of rotation possessed by the second CP light beam that is generated.

Particularly, the optical modulator comprises at least one FLC HWP reconfigurable by at least one electrical signal applied to the at least one FLC HWP such that the at least one electrical signal controls whether the first and second polarization orientations are same or mutually orthogonal. It follows that the at least one electrical signal also controls selection of the left or right side in deflecting the second CP light beam. When the left side is switched to the right side or vice versa, a transition period for the second CP light beam to transit between the left and right sides is governed by a time of reconfiguring the at least one FLC HWP in response to a change of the at least one electrical signal.

In one embodiment, the at least one FLC HWP consists of a first FLC HWP only.

In another embodiment, the at least one FLC HWP consists of a first FLC HWP and a second FLC HWP serially cascaded together. The at least one electrical signal consists of a first electrical signal for reconfiguring the first FLC HWP, and a second electrical signal for reconfiguring the second FLC HWP. To cause the second polarization orientation to be orthogonal to the first polarization orientation, the first and second electrical signals are synchronized to be mutually out-of-phase. To cause the second polarization orientation to be same as the first polarization orientation, the first and second electrical signals are synchronized to be in-phase. Preferably, each of the first and second electrical signals over a given duration is a bipolar signal symmetrical with respect to zero volt and having an amplitude transition at a mid-point of the duration, causing each of the first and second FLC HWPs to be driven with a zero DC voltage averaged over the duration.

A second aspect of the present invention is to provide a beam-steering apparatus for deflecting an incident LP light beam by a selected angle from an incident direction. The apparatus has fast response in beam steering as well as an enhanced steering resolution.

The beam-steering apparatus comprises a front-end QWP for transforming the incident LP light beam to an incident CP light beam, and plural beam-deflecting units serially cascaded together such that the incident CP light beam is successively deflected during traveling over the beam-deflecting units. Each of the beam-deflecting units is realized as any of the embodiments of the beam-deflecting device as set forth in the first aspect of the present invention. The apparatus further comprises an electronic controller configured to determine and generate the at least one electrical signal for each of the beam-deflecting units such that the selected angle equals a sum of signed deflection angles each provided by an individual beam-deflection unit. For the individual beam-deflection unit, the signed deflection angle has a magnitude given by the deflection angle and a sign determined according to the left or right side that is selected.

A third aspect of the present invention is to provide a system for projecting an image with a FOV enhanced by using any of the embodiments of the beam-steering apparatus as disclosed in the second aspect of the present invention.

The system comprises an image generator, and the beam-steering apparatus realized according of any embodiment of the second aspect of the present invention. The image generator is used for generating the image in LP light. The beam-steering apparatus is used to deflect the image.

In one embodiment, the image generator comprises a light source for generating LP light, a passive DOE module for generating the image upon illuminated by the light source such that the image is carried in LP light, and a fine steerer located between the passive QWP and the passive DOE module for additionally deflecting the image carried in CP light. In particular, the fine steerer has a steering angle range narrower than a steering angle range provided by the beam-steering apparatus. It follows that the beam-steering apparatus increases a FOV provided by the system in comparison to using the fine steerer alone.

In another embodiment, the image generator comprises a light source for generating LP light, and a SLM for generating and steering the image upon illuminated by the light source such that the image is carried in LP light and is changeable by programming the SLM. Particularly, the SLM has a steering angle range narrower than a steering angle range provided by the beam-steering apparatus so that the beam-steering apparatus increases a FOV provided by the system in comparison to using the SLM alone.

Other aspects of the present invention are disclosed as illustrated by the embodiments hereinafter.

DETAILED DESCRIPTION

As occasionally used hereinafter, a sense of rotation of a CP light beam is either LH or RH, and a LP light beam is characterized with a polarization orientation. Sometimes but not absolutely necessary, the LP light beam is confined to have one of two mutually-orthogonal polarization orientations regarded as H (horizontal) and V (vertical) according to some coordinate system.

The fast switching property of FLC is advantageously used in a beam-deflecting device disclosed herein to rapidly steer the light beam from deflecting to one side of an incident direction to deflecting to an opposite side thereof. The fast response time of FLC stems from spontaneous polarization of FLC molecules, a property not possessed by nematic LC. However, unlike conventional nematic LC, the EO response of FLC is an in-plane switching type. A special optical design is required for the beam-deflecting device to account for this unique EO response of FLC.

A first aspect of the present invention is to provide a device for controllably deflecting a first CP light beam from an incident direction. The device essentially employs a non-mechanical mechanism for deflecting the first CP light beam.

Figure 1:
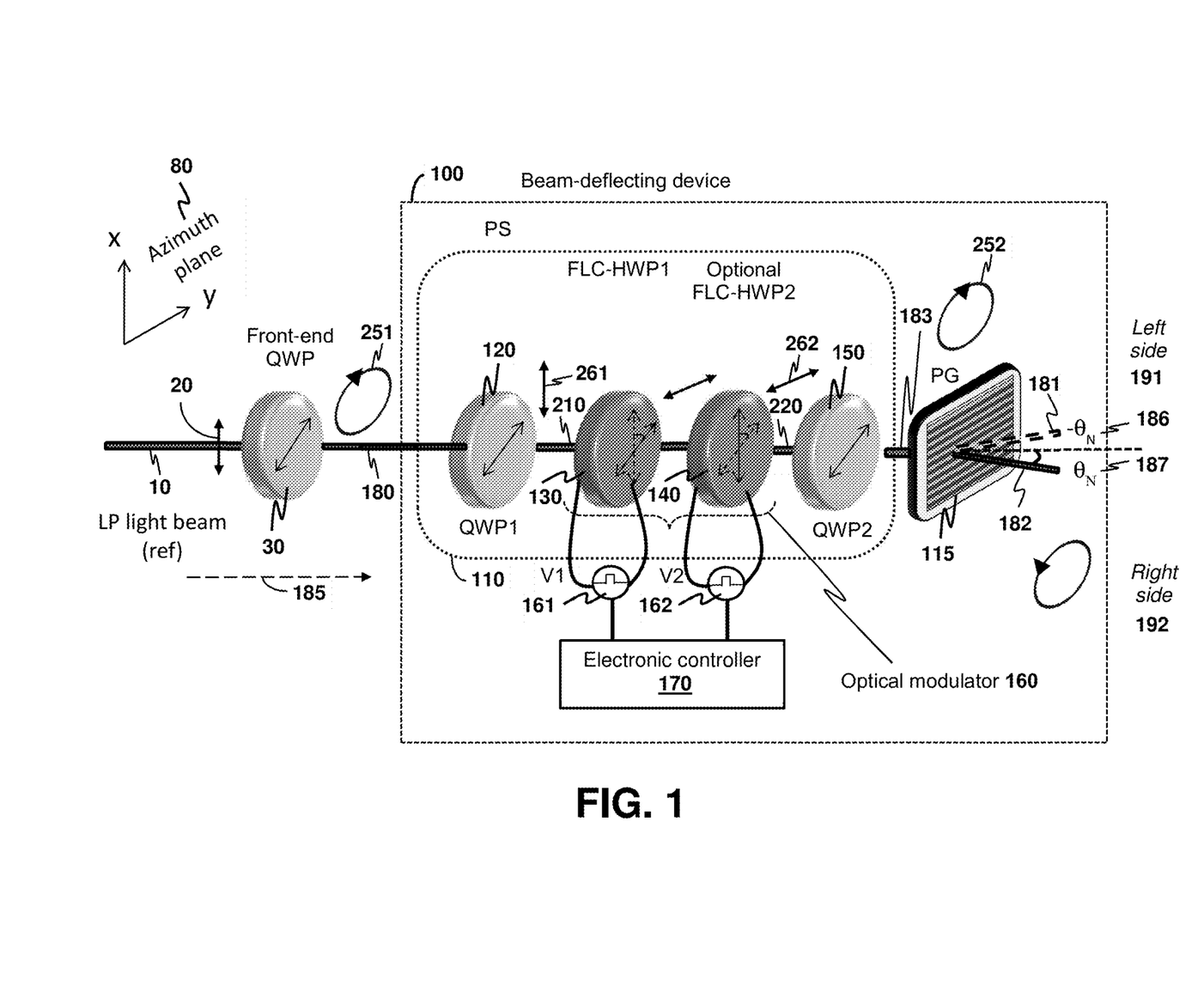
FIG. 1 depicts a beam-deflecting device in accordance with an exemplary embodiment of the present invention.

FIG. 1 depicts an exemplary embodiment of the disclosed device. A beam-deflecting device 100 is used to controllably deflect a first CP light beam 180 from an incident direction 185. The first CP light beam 180 has a first sense of rotation 251. As the first CP light beam 180 has a circular polarization, the first sense of rotation 251 is either LH or RH.

The beam-deflecting device 100 comprises a PG 115 for receiving a second CP light beam 183 generated from the first CP light beam 180 and for deflecting the received second CP light beam 183 from the incident direction 185 by a deflection angle (186 or 187) to a left side 191 or a right side 192 of the incident direction 185. The second CP light beam 183 has a second sense of rotation 252, which is either LH or RH. As it is a property of PGs (see the disclosure of J. Buck et al. as mentioned above), selection of the left side 191 or the right side 192 in deflecting the second CP light beam 183 is determined according to the second sense of rotation 252. In practical realizations of the PG 115 by nematic LC or LC polymer, e.g., in US2012/0188467, deflection angles 186, 187 are the same, or substantially close together, regardless of whether the second CP light beam 183 travels to the left side 191 to form a left-deflecting output light beam 181 or travels to the right side 192 to form a right-deflecting output light beam 182.

The left side 191 and the right side 192, which are opposite to each other along the incident direction 185, are relative concepts and are not uniquely defined when a 3D space is considered. When those skilled in the art define the left side 191 in the space first, the right side 192 is immediately obtained as a side opposite to the left side 191 along the incident direction 185. Those skilled in the art may also assign the right side 192 to be a new left side when the beam-deflecting device 100 is turned upside down. As will soon be evident, optical elements in the disclosed device 100 are aligned in a manner such that the disclosed beam-deflecting device 100 is rotationally invariant in structure. Therefore, any partition of the space into the left and right sides 191, 192 along the incident direction 185 does not affect the uniqueness in defining the structure of the beam-deflecting device 100. In the present disclosure, the beam-deflecting device 100 is described with the left and right sides 191, 192 as shown in FIG. 1, where the beam-deflecting device 100 is depicted on an azimuth plane 80 (x-y plane).

Given that one wishes to direct the second CP light beam 183 to a desired side, which is either the left side 191 or the right side 192, one is required to set the second sense of rotation 252 to a particular sense of rotation determined according to the desired side. The second sense of rotation 252 may be the same or mutually orthogonal to the first sense of rotation 251. Hence, it is required to have a user-configurable optical element to adjust the first CP light beam 180 to have the second sense of rotation 252. The beam-deflecting device 100 further comprises a PS 110 for controllably maintaining or reversing the first sense of rotation 251 of the first CP light beam 180 so as to generate the second CP light beam 183 that possesses the second sense of rotation 252.

In the beam-deflecting device 100, the PS 110 is an active optical device that is externally controllable. To have a fast response time in beam steering, FLC is used in forming one or more optical elements in the PS 110. The PG 115 is circular-polarization sensitive while most existing FLC-based devices, due to manufacturing constraints, are designed to be responsive only to LP light beams. The PS 110 is developed by taking this limitation into account.

The PS 110 as disclosed herein comprises a first QWP 120, an optical modulator 160 and a second QWP 150 where the optical modulator 160 is sandwiched between the first and second QWPs 120, 150. The optical modulator 160 comprises a first FLC HWP 130 reconfigurable by a first electrical signal 161, and optionally a second FLC HWP 140 reconfigurable by a second electrical signal 162. The first FLC HWP 130 and the second HWP 140 each function as a HWP but the fast axis thereof is reconfigurable by the corresponding electrical signal (161 or 162). Though skilled in the art will appreciate that once the fast axis of an optical element is defined, the slow axis thereof is identifiable as an axis orthogonal to the fast axis. An electronic controller 170 is used for generating the first electrical signal 161 and, if the second FLC HWP 140 is present, the second electrical signal 162.

Figure 2A:
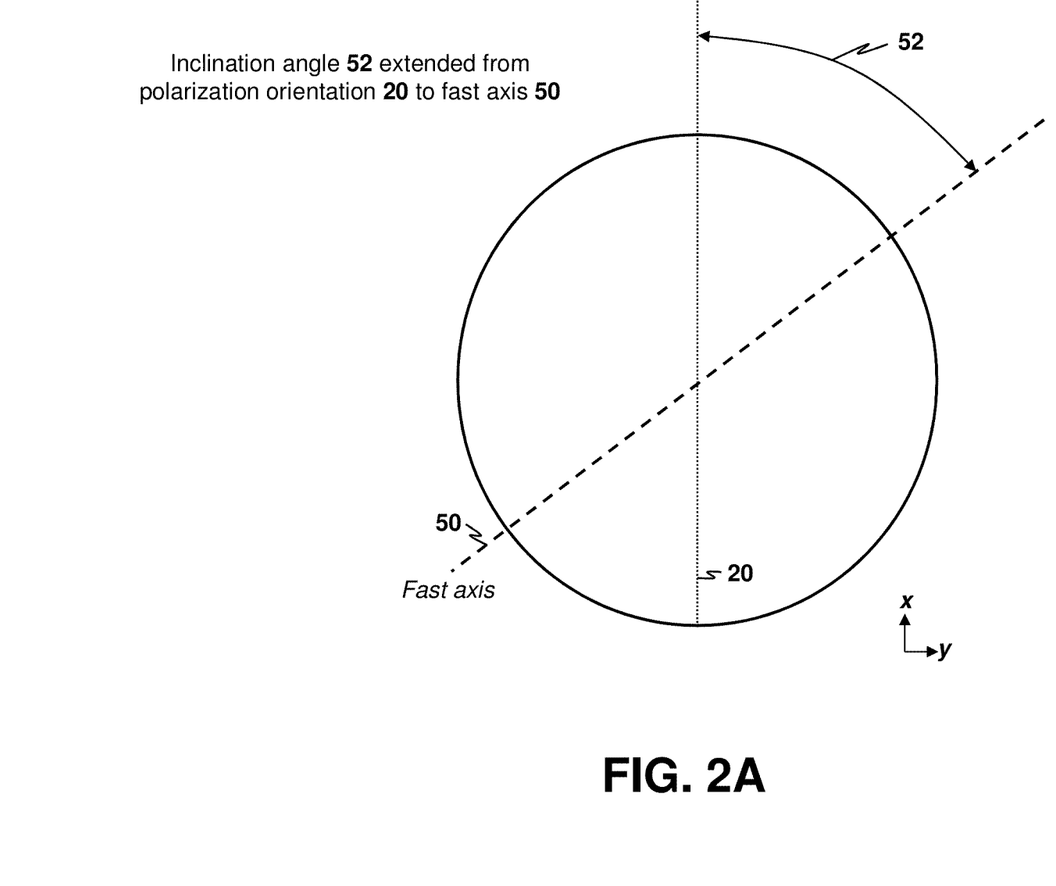
FIG. 2A illustrates an orientation of a fast axis.
Figure 2B:
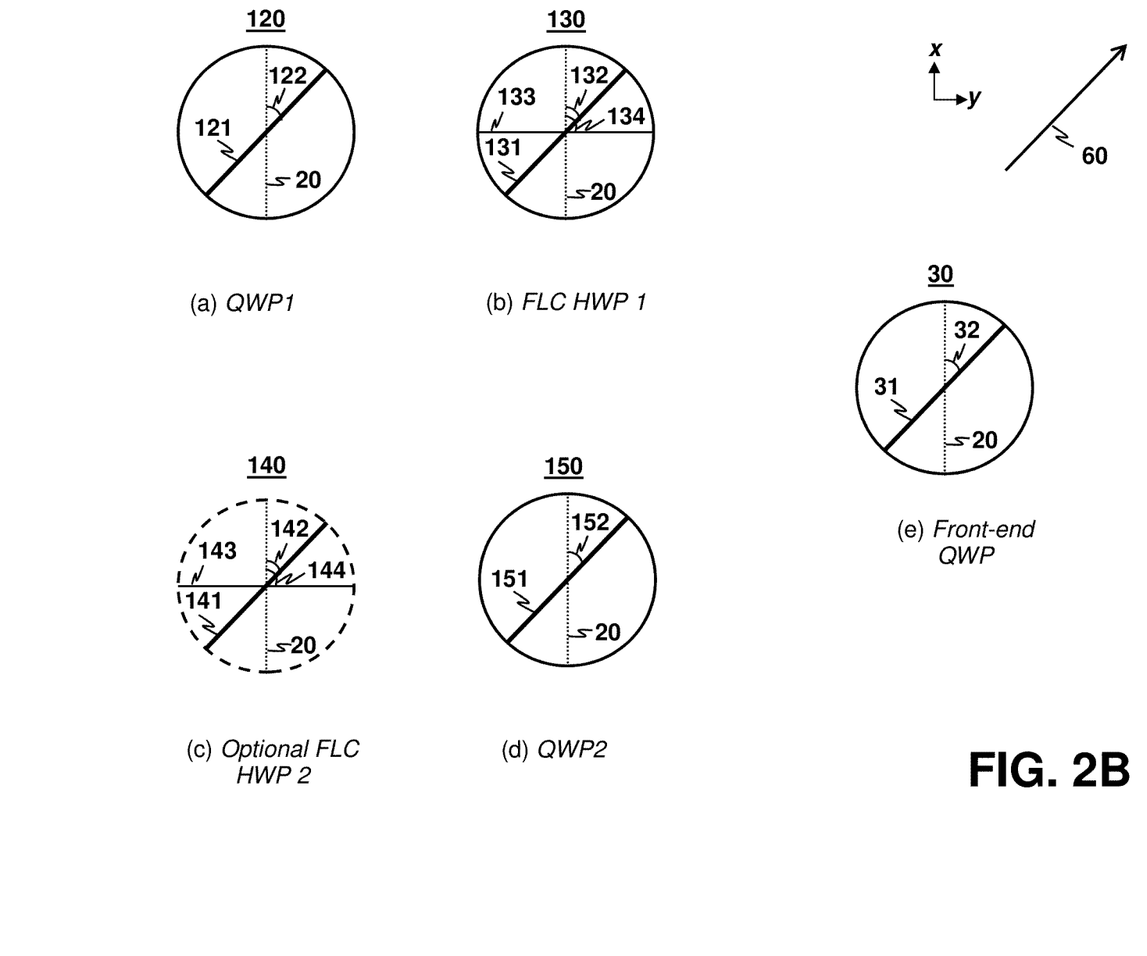
FIG. 2B illustrates fast axes of QWPs and HWPs in the beam-deflecting device.

For illustrative purposes only, a LP light beam 10 is used to generate the first CP light beam 180 by transmitting the LP light beam 10 through a front-end QWP 30. The LP light beam 10 has a polarization orientation 20 to be used as reference in illustrating fast-axis orientation of various QWPs and HWPs in the disclosed device 100. FIG. 2A illustrates an inclination angle 52 extended from the polarization orientation 20 to a certain fast axis 50. As an example only, FIG. 2B illustrates fast axes of (a) the first QWP 120, (b) the first FLC HWP 130, (c) the second FLC HWP 140 (d) the second QWP 150 and (e) the front-end QWP 30. The first QWP 120 has a first fast axis 121, which makes an inclination angle 122 with respect to the polarization orientation 20. The second QWP 150 has a second fast axis 151, which makes an inclination angle 152. The first FLC HWP 130 has a third fast axis, where the third fast axis is reconfigurable by the first electrical signal 161 to adopt either a first orientation 131 or a second orientation 133. The first orientation 131 and the second orientation 133 make inclination angles 132, 134, respectively. The second FLC HWP 140 has a fourth fast axis, where the fourth fast axis is reconfigurable by the second electrical signal 162 to adopt either a third orientation 141 or a fourth orientation 143. The third orientation 141 and the fourth orientation 143 make inclination angles 142, 144, respectively. The front-end QWP 30 is a passive QWP with a fifth fast axis 31, making an inclination angle 32 with respect to the polarization orientation 20.

The Inventors have determined the following inclination angles to be used for the disclosed device 100 such that the PS 110 can controllably maintain or reverse the first sense of rotation 251 of the first CP light beam 180 for generating the second CP light beam 183 having the second sense of rotation 252.

The first QWP 120 and the second QWP 150 have their inclination angles 122, 152, the same and selected to be either 45° or −45°.
  The first FLC HWP 130 has the inclination angle 132 of the first orientation 131 to be 45° or −45°, and has the inclination angle 134 of the second orientation 133 to be 0° or 90°.
  The second FLC HWP 140 has the inclination angle 142 of the third orientation 141 to be 45° or −45°, and has the inclination angle 144 of the fourth orientation 143 to be 0° or 90°.
  The first orientation 131 that is selected needs not be the same as the selected third orientation 141. Similarly, the selected second orientation 133 needs not be the same as the selected fourth orientation 143.

To enable the LP light beam 10 to generate the first CP light beam 180, the front-end QWP 30 has the inclination angle 32 the same as the inclination angle 122 of the first QWP 120 (or the inclination angle 152 of the second QWP 150).

Although the aforementioned inclination angles are 0° or multiples of 45°, and specify intended orientations to which fast axes are pointed, practically misalignment with the intended orientations exist. As experimentally determined by the Inventors, the beam-deflecting device 100 is workable if each of the first fast axis 121, the second fast axis 151 and the first and second orientations 131, 133 of the third axis deviates from an intended orientation by at most 2°. In case the optical modulator 160 has the second FLC HWP 140, each of the third and fourth orientations 141, 143 of the fourth axis deviates from an intended orientation by at most 2°.

From the above-mentioned choices of fast axes, those skilled in the art will appreciate that without reference to the polarization orientation 20, the fast-axis orientation is expressible by the following characterization.

The first and second fast axes 121, 151 are oriented along a certain pointing direction, e.g., a pointing direction 60 as shown in FIG. 2B.

The first orientation 131 is along or orthogonal to the pointing direction 60. The second orientation 133 has a 45° or −45° offset from the first orientation 131.

The third orientation 141 is along or orthogonal to the pointing direction 60. The fourth orientation 143 has a 45° or −45° offset from the third orientation 141.

The functions performed by various optical elements in the PS 110 are described as follows. The first QWP 120 is used for transforming the first CP light beam 180 to a first LP light beam 210 having a first polarization orientation 261. The first QWP 120 is further arranged as mentioned above such that the first sense of rotation 251 determines the first polarization orientation 261. The optical modulator 160 is used for adjusting the first polarization orientation 261 of the first LP light beam 210 to a second polarization orientation 262 so as to form a second LP light beam 220 having the second polarization orientation 262. The second QWP 150 is used for transforming the second LP light beam 220 to the second CP light beam 183. In addition, the second QWP 150 is arranged as mentioned above such that the second polarization orientation 262 determines the second sense of rotation 252 possessed by the second CP light beam 183.

In a first embodiment of the beam-deflecting device 100, the optical modulator 160 is equipped with the first FLC HWP 130 only.

Figure 3:
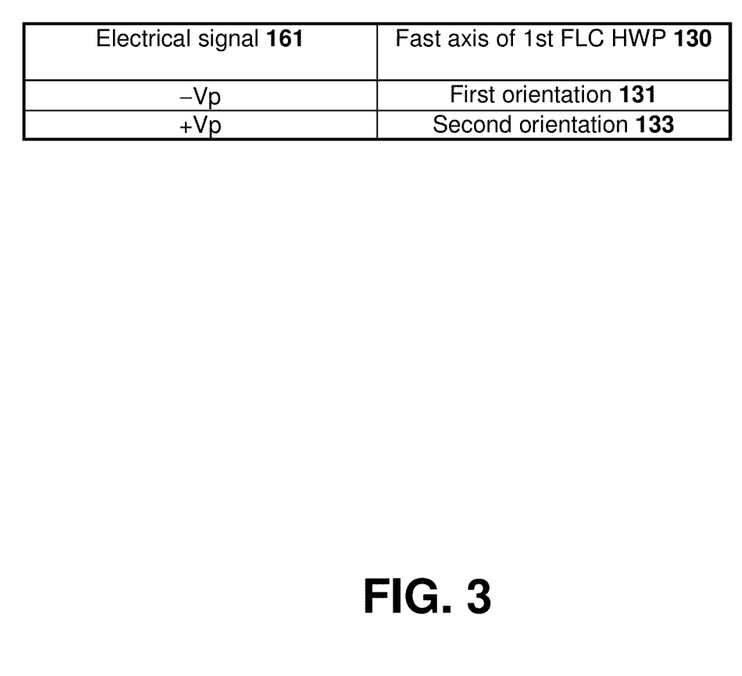
FIG. 3 illustrates voltage levels used in reconfiguring an optical modulator realized with only one FLC HWP in accordance with one embodiment of the present invention, the optical modulator being used in the beam-deflecting device.

The first electrical signal 161 is applied to the first FLC HWP 130 to create a potential difference across the first FLC HWP 130 and hence an electric field therein. The purpose of creating the electric field inside the first FLC HWP 130 is to orient FLC molecules therein in a certain way so as to orient the third fast axis of the first FLC HWP 130 to adopt the first orientation 131 or the second orientation 133. Whether the first orientation 131 or the second orientation 133 is adopted is determined according to the voltage of the first electrical signal 161. In one choice of voltage levels for the first electrical signal 161 as shown in FIG. 3, two antipodal voltage levels, denoted as $-V_P$ and $+V_P$, are used for orientation selection. When the first electrical signal 161 has a voltage of $-V_P$, the first orientation 131 is adopted as an illustrative example. When the first electrical signal 161 has a voltage of $+V_P$, the first FLC HWP 130 adopts the second orientation 133 in orienting the third fast axis. As such, the first electrical signal 161 controls whether the first and second polarization orientations 261, 262 are same or mutually orthogonal. Furthermore, the first electrical signal 161 controls the outcome of the second polarization orientation 262.

The advantage of the beam-deflecting device 100 as disclosed herein is apparent when one wishes to switch the device output from the left-deflecting output light beam 181 to the right-deflecting output light beam 182 or vice versa. A transition period for the second CP light beam 183 to transit between the left side 191 and the right side 192 is given by a time taken by the first FLC HWP 130 to reconfigure itself so as to switch between the first and second orientations 131, 133. Switching between the two orientations 131, 133 is achieved by reorienting FLC molecules in the first FLC HWP 130. Due to spontaneous polarization of the FLC molecules, the first FLC HWP 130 takes a short switching time of around 10 μs to 200 μs. Therefore, the transition period for switching from one side to another is also around 10 μs to 200 μs, offering the beam-deflecting device 100 an advantage of fast response.

Table 1 lists the senses of orientation and the polarization orientations of the involved light beams 180, 210, 220, 183 against the two voltages $(-V_P, +V_P)$ of the first electrical signal 161. For convenience, the first orientation 131 and the second orientation 133 are selected to be 45° (obtained by a voltage of $-V_P$) and 0° (obtained by a voltage of $+V_P$), respectively, in obtaining Table 1. Note that if the third fast axis has a 45° orientation, a change of the first polarization orientation 261 results and the first and second polarization orientations 261, 262 are mutually orthogonal; if the third fast axis has a 0° orientation, there is no change in the first polarization orientation 261. From Table 1, it is apparent that if the first sense of rotation 251 of the first CP light beam 180 is known and it is given a desired side (the left side 191 or the right side 192) to which the first CP light beam 180 is intended to be deflected, then the required voltage of the first electrical signal 161 applied to the first FLC HWP 130 is uniquely determinable.

TABLE 1

| 1st electrical signal 161 | 1st sense of rotation 251 | 1st polarization orientation 261 | 2nd polarization orientation 262 | 2nd sense of rotation 252 | Deflecting to: |
| --- | --- | --- | --- | --- | --- |
| $-V_P$ | LH | H | V | LH | Left side 191 |
| $+V_P$ | LH | H | H | RH | Right side 192 |
| $-V_P$ | RH | V | H | RH | Right side 192 |
| $+V_P$ | RH | V | V | LH | Left side 191 |

A LC cell is preferred to have DC balancing in applying a potential difference across the LC cell; otherwise free carriers would be injected into a LC layer inside the cell, potentially leading to undesirable consequences such as shortening the lifetime of the beam-deflecting device 100. For the cell made of nematic LC, a square-wave signal having the same positive and negative peak voltage without a DC component is applied across the LC cell to achieve DC balancing. This scheme works well for a nematic LC cell because the EO response of nematic LC is the same for both positive and negative voltages. However, adopting this driving scheme would not work for FLC as the EO responses for positive and negative voltages are different, potentially leading to operational flickering of the output light beam steering from the left-deflecting one 181 to the right-deflecting one 182 or vice-versa.

In a second embodiment of the beam-deflecting device 100, DC balancing is introduced. The optical modulator 160 is formed by serially cascading the first FLC HWP 130 and the second FLC HWP 140 together. The third fast axis of the first FLC HWP 130 adopts the first orientation 131 or the second orientation 133 according to the first electrical signal 161. The fourth fast axis of the second FLC HWP 140 adopts the third orientation 141 or the fourth orientation 143 according to the second electrical signal 162. Particularly, the waveforms used for the first and second electrical signals 161, 162 are designed for achieving DC balancing.

Figure 4:
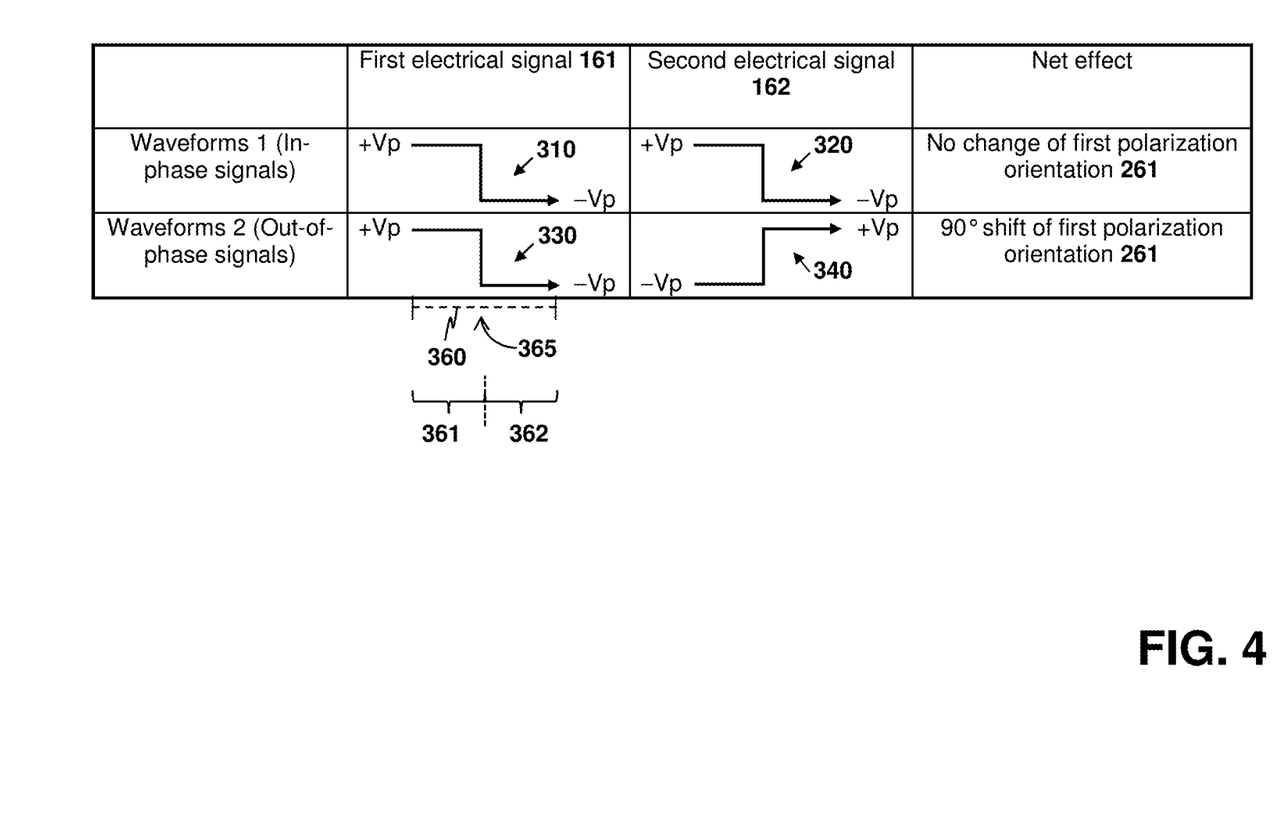
FIG. 4 illustrates signal waveforms used in reconfiguring an optical modulator realized by a serial cascade of two FLC HWPs in accordance with one embodiment of the present invention, the optical modulator being used in the beam-deflecting device.

FIG. 4 depicts exemplary waveforms used by the first and second electrical signals 161, 162 for configuring the optical modulator 160 for achieving DC balancing. Waveforms 310, 320, which form a pair of in-phase waveforms synchronized over a duration 360, are used as the first and second electrical signals 161, 162, respectively, for maintaining the first polarization orientation 261 without change after passing through the first and second FLC HWPs 130, 140. Waveforms 330, 340, which are a pair of mutually out-of-phase waveforms synchronized over the duration 360, are used as the first and second electrical signals 161, 162, respectively, for making a 90° shift of the first polarization orientation 261.

To demonstrate the usefulness of the two pairs of synchronized waveforms, without loss of generality consider a special case that the first and third orientations 131, 141 are 45° (obtained by a voltage of $-V_P$), and that the second and fourth orientations 133, 143 are 0° (obtained by a voltage of $+V_P$). The duration 360 is divided into a first half duration 361 and a second half duration 362. Table 2 lists the effects by driving the first and second FLC HWPs 130, 140 over the first half duration 361 and the second half duration 362 with the pair of in-phase waveforms 310, 320. Table 3 lists the corresponding effects when the pair of out-of-phase waveforms 330, 340 is used.

TABLE 2

| | Fast-axis orientation of first FLC HWP 130 | Fast-axis orientation of second FLC HWP 140 | Effect to first polarization orientation 261 in each half duration |
|---|---|---|---|
| 1st half duration 361 | 0° | 0° | No change of polarization orientation |
| 2nd half duration 362 | 45° | 45° | No change of polarization orientation |

TABLE 3

| | Fast-axis orientation of first FLC 130 | Fast-axis orientation of cell HWP 140 | Effect to first polarization orientation second FLC 261 in each half duration |
|---|---|---|---|
| 1st half duration 361 | 0° | 45° | 90° shift of polarization orientation |
| 2nd half duration 362 | 45° | 0° | 90° shift of polarization orientation |

It is apparent that over the whole duration 360, the first and second polarization orientations 261, 262 are the same if the pair of in-phase waveforms 310, 320 is used, whereas the two polarization orientations 261, 262 are mutually orthogonal if the pair of out-of-phase waveforms 330, 340 is employed.

From the waveforms 310, 320, 330, 340, those skilled in the art will appreciate that each of the first and second electrical signals 161, 162 over the whole duration 360 is a bipolar signal symmetrical with respect to zero volt and having an amplitude transition at a mid-point 365 of the duration 360, causing each of the first and second FLC HWPs 130, 140 to be driven with a zero DC voltage averaged over the duration 360. Thereby, DC balancing is achieved.

The waveforms 310, 320, 330, 340 may be modified in a number of ways to achieve the same aforementioned effects while keeping the advantage of DC balancing. In one way, both in-phase waveforms 310, 320 are inverted such that each of the waveforms 310, 320 after modification has the voltage of $-V_P$ in the first half duration 361 and the voltage of $+V_P$ in the second half duration 362. Note that the inverted version of the pair of in-phase waveforms 310, 320 is also one pair of in-phase waveforms. Similarly, both out-of-phase waveforms 330, 340 may also be inverted.

Those skilled in the art may generalize the observations made above and yield the following characterization to the first and second electrical signals 161, 162. To cause the second polarization orientation 262 to be orthogonal to the first polarization orientation 261 over the duration 360, the first electrical signal 161 configures the first FLC HWP 130 to adopt the first orientation 131 over the first half duration 361 and the second orientation 133 over the second half duration 362 while the second electrical signal 162 configures the second FLC HWP 140 to adopt the fourth orientation 143 over the first half duration 361 and the third orientation 141 over the second half duration 362. To cause the second polarization orientation 262 to be same as the first polarization orientation 261 over the duration 360, the first electrical signal 161 configures the first FLC HWP 130 to adopt the first orientation 131 over the first half duration 361 and the second orientation 133 over the second half duration 362 while the second electrical signal 162 configures the second FLC HWP 140 to adopt the third orientation 141 over the first half duration 361 and the fourth orientation 143 over the second half duration 362.

Depending on applications, the first CP light beam 180 may be visible or invisible. For example, if the device 100 is used in a projector for projecting an image visually viewable by humans, the first CP light beam 180 is visible. In another example, if the first CP light beam 180 is used for sensing a surrounding space, IR light may be used. In general, the PG 115, the first QWP 120, the first and second FLC HWPs 130, 140, and the second QWP 150 are configured to be responsive to the wavelength range of interest.

A second aspect of the present invention is to provide a beam-steering apparatus for deflecting an incident CP light beam by a selected angle from an incident direction. In particular, the beam-steering apparatus provides an enhanced steering resolution by adopting a multi-stage approach similar to the device of US2012/0188467, as well as a fast response as provided by the beam-deflecting device disclosed above.

Figure 5:
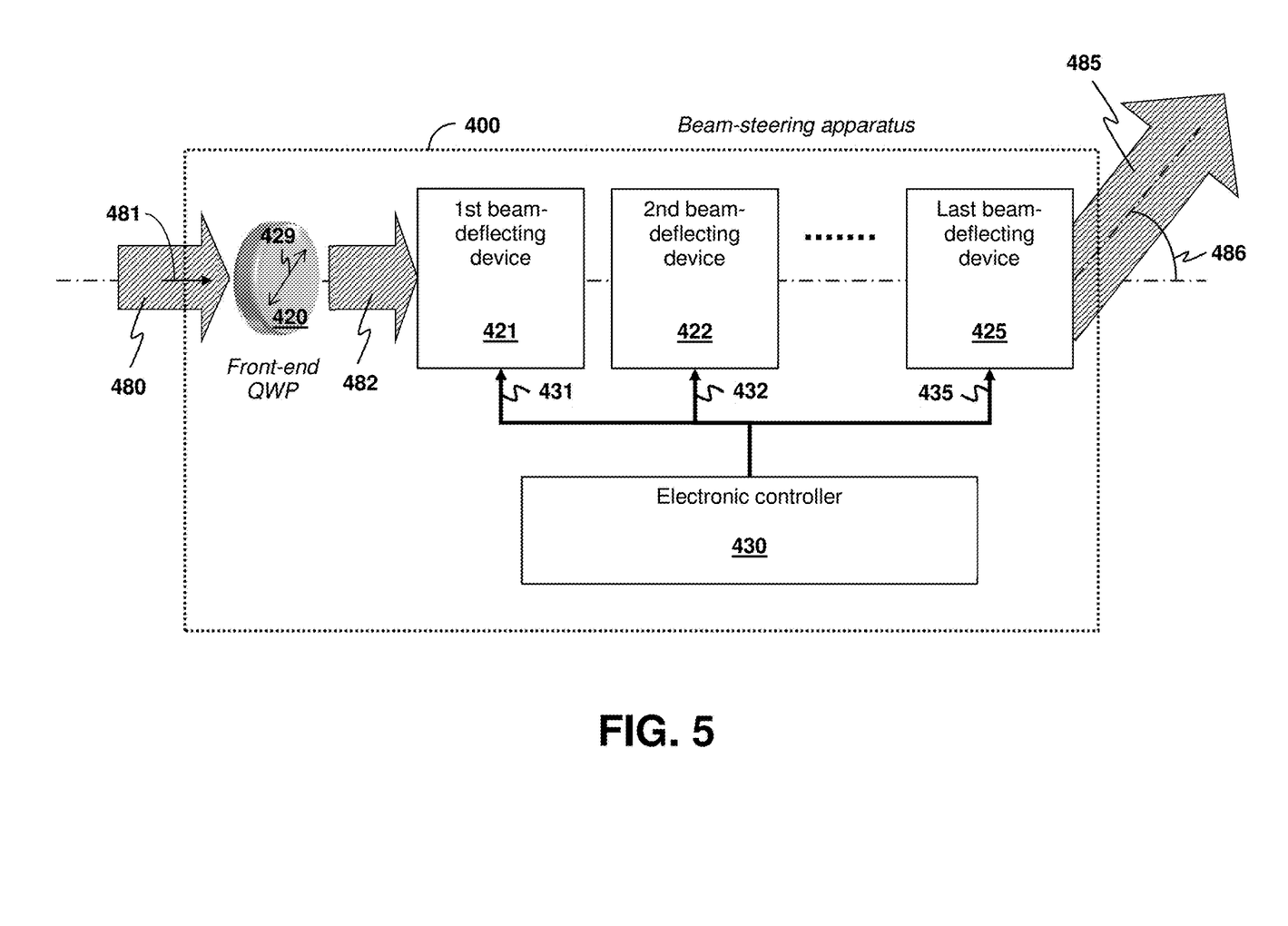
FIG. 5 depicts, in accordance with an exemplary embodiment of the present invention, a beam-steering apparatus formed by serially cascading multiple beam-deflecting devices for improving beam-steering resolution.

FIG. 5 depicts a beam-steering apparatus 400 in accordance with an exemplary embodiment of the present invention. The apparatus 400 receives an incident LP light beam 480 and deflects it by a selected angle 486 from an incident direction 481 to form an output light beam 485. The apparatus 400 comprises a front-end QWP 420 for transforming the incident LP light beam 480 to an incident CP light beam 482, and plural beam-deflecting units 421, 422, 425 serially cascaded together such that the incident CP light beam 482 is successively deflected during traveling over the beam-deflecting units 421, 422, 425. Each of the beam-deflecting units 421, 422, 425 is realized as any of the embodiments of the beam-deflecting device disclosed above in the first aspect of the present invention. The front-end QWP 420 is similar in function to the front-end QWP 30 in FIG. 1. Hence, the front-end QWP 420 has a fast axis 429 (similar to the fifth fast axis 31) substantially parallel to the first fast axis 121 of the beam-deflecting unit 421, which is immediately adjacent to the front-end QWP 420. The apparatus 400 further comprises an electronic controller 430 configured to determine and generate one or more electrical signals for each beam-deflecting unit. For example, a first set of electrical signal(s) 431, a second set of electrical signal(s) 432 and a third set of electrical signal(s) 435 are generated for the beam-deflecting units 421, 422, 425, respectively. In particular, the one or more electrical signals are determined such that the selected angle equals a sum of signed deflection angles each provided by an individual beam-deflection unit. For the individual beam-deflection unit, the signed deflection angle has a magnitude given by the deflection angle and a sign determined according to the left or right side that is selected.

Although three beam-deflecting units 421, 422, 425 are depicted in FIG. 5 for illustration of the present invention, the present invention is not limited to only this number of beam-deflecting units 421, 422, 425. Any two or more beam-deflecting units may be used in forming the apparatus 400.

A third aspect of the present invention is to provide a system for projecting an image with a FOV enhanced by using any of the embodiments of the beam-steering apparatus as disclosed in the second aspect of the present invention. The image may be any image. For example, the image may be a visual image for human viewing, or a structured-light pattern transmitted in IR for some engineering purposes such as for 3D object measurement.

Figure 6:
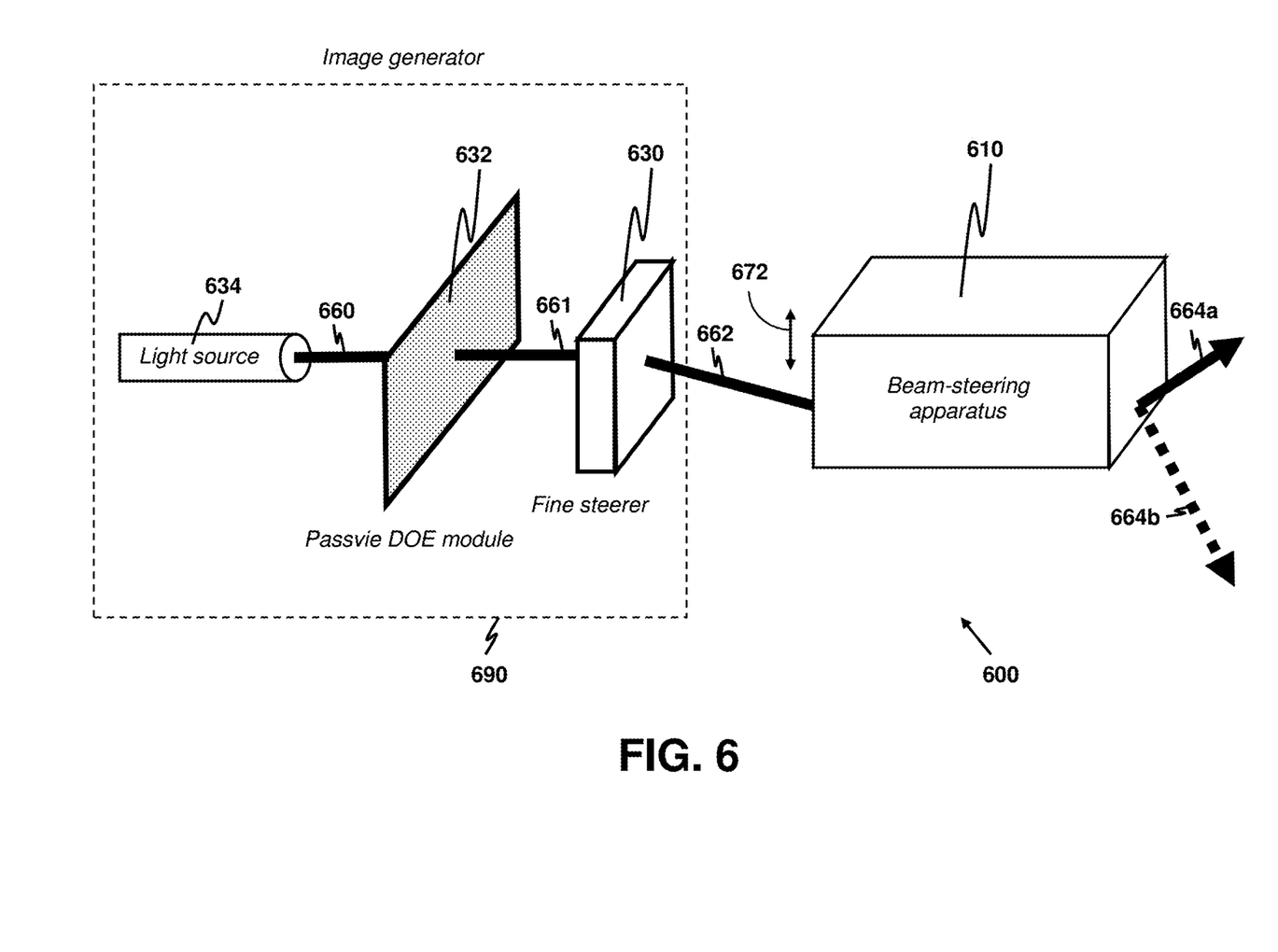
FIG. 6 depicts a first embodiment of a system comprising the disclosed beam-steering apparatus for projecting an image with enhanced FOV, where the system uses a passive DOE to generate the image.

A first embodiment of the system disclosed herein is depicted in FIG. 6. A system 600 comprises an image generator 690 and a beam-steering apparatus 610. The image generator 690 is used for generating an image 662 in LP light. The beam-steering apparatus 610, realized according to any embodiment of beam-steering apparatus as disclosed above in the second aspect of the present invention, is used for deflecting the image 662 to form an output image (664a or 664b). Note that the image 662 carried in LP light has a role similar to the LP light beam 10 in FIG. 1. As such, a polarization orientation 672 of the LP light of the image 662 has a 45° or −45° offset from the fast axis 429 of the front-end QWP 420 of the beam-steering apparatus 610.

The image generator 690 comprises a light source 634, a passive DOE module 632 and a fine steerer 630. The light source 634 is used for generating LP light 660. The passive DOE module 632 is used for generating a second image 661 when the passive DOE module 632 is illuminated by the LP light 660 to form the second image 661 that is carried in LP light. The fine steerer 630, located between the passive QWP 620 and the passive DOE module 632, is used for providing certain image deflection to the second image 661 to form the image 662. In particular, the fine steerer 630 has a steering angle range narrower than a steering angle range provided by the beam-steering apparatus 610. Thus, the beam-steering apparatus advantageously increases a FOV provided by the system 600 when compared to using the fine steerer 630 alone.

In one option, the passive DOE module 632 is a Dammann grating. In another option, the fine steerer 630 is a liquid prism or a variable optical array (such as an optical phased array).

Figure 7:
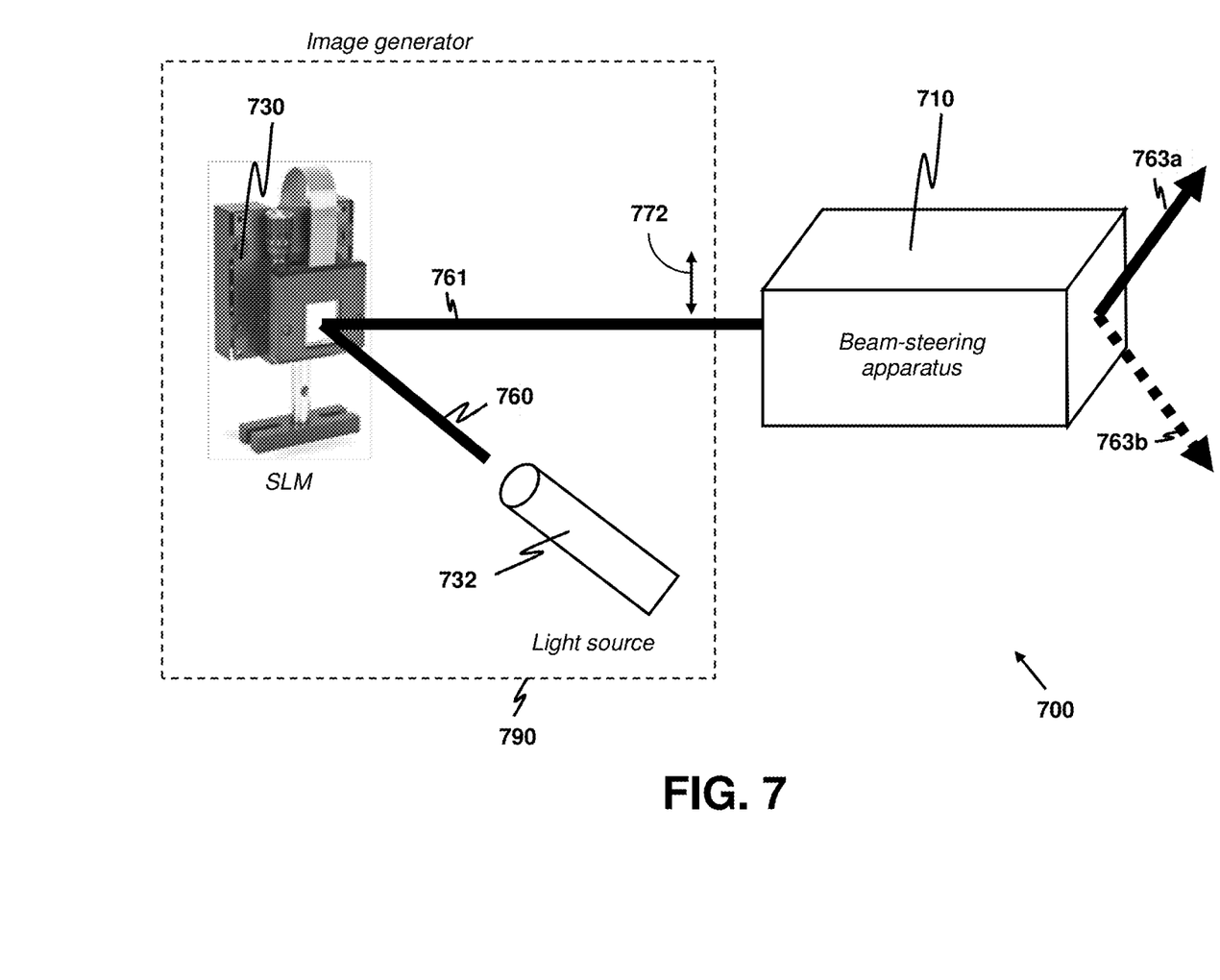
FIG. 7 depicts a second embodiment of a system comprising the disclosed beam-steering apparatus for projecting an image with enhanced FOV, where the system uses an active SLM to generate the image that is changeable by programming the SLM.

A second embodiment of the system disclosed herein is depicted in FIG. 7. Similar to the system 600, a system 700 comprises an image generator 790 and a beam-steering apparatus 710. The image generator 790 is used for generating an image 761 in LP light. The beam-steering apparatus 710, realized according to any embodiment of beam-steering apparatus as disclosed above in the second aspect of the present invention, is used for deflecting the image 761 to form an output image (763a or 763b). Similar to the system 600 in the above-mentioned first embodiment, a polarization orientation 772 of the LP light of the image 761 makes a 45° or −45° offset from the fast axis 429 of the front-end QWP 420 of the beam-steering apparatus 710.

The image generator 790 comprises a light source 732 and a SLM 730. The light source 732 is used for generating LP light 760. The SLM 730 is an active device for generating the image 761 and steering the generated image 761 when the SLM 730 is illuminated by the light source 732. It follows that the image 761 is carried in LP light. Furthermore, the image 761 is changeable by programming the SLM 730. In particular, the SLM 730 has a steering angle range narrower than a steering angle range provided by the beam-steering apparatus 710. Effectively, the beam-steering apparatus 710 increases a FOV provided by the system 700 in comparison to using the SLM 730 alone.

The SLM 730 may be a LCoS or a DMD.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A device for controllably deflecting a first circularly-polarized (CP) light beam from an incident direction, the first CP light beam having a first sense of rotation, the device comprising:
 a polarization grating (PG) for receiving a second CP light beam generated from the first CP light beam and deflecting the received second CP light beam from the incident direction by a deflection angle to a left side or a right side of the incident direction, the second CP light beam having a second sense of rotation, wherein selection of the left or right side in deflecting the second CP light beam is determined according to the second sense of rotation; and
 a polarization selector (PS) for controllably maintaining or reversing the first sense of rotation of the first CP light beam to generate the second CP light beam that possesses the second sense of rotation, the PS comprising:
 (a) a first quarter-wave plate (QWP) for transforming the first CP light beam to a first linearly-polarized (LP) light beam having a first polarization orientation, the first QWP being arranged such that the first sense of rotation determines the first polarization orientation;
 (b) an optical modulator for adjusting the first polarization orientation of the first LP light beam to a second polarization orientation so as to form a second LP light beam having the second polarization orientation; and (c) a second QWP for transforming the second LP light beam to the second CP light beam, the second QWP being arranged such that the second polarization orientation determines the second sense of rotation possessed by the second CP light beam that is generated;

wherein the optical modulator comprises at least one ferroelectric liquid crystal (FLC) half-wave plate (HWP) reconfigurable by at least one electrical signal applied to the at least one FLC HWP such that the at least one electrical signal controls whether the first and second polarization orientations are same or mutually orthogonal and thereby controls selection of the left or right side in deflecting the second CP light beam, whereby when the left side is switched to the right side or vice versa, a transition period for the second CP light beam to transit between the left and right sides is governed by a time of reconfiguring the at least one FLC HWP in response to a change of the at least one electrical signal.

2. The device of claim 1 further comprising an electronic controller for determining and generating the at least one electrical signal.

3. The device of claim 2, wherein:
the at least one electrical signal consists of a first electrical signal;
the at least one FLC HWP consists of a first FLC HWP;
the first QWP has a first fast axis, the second QWP has a second fast axis, and the first FLC HWP has a third fast axis; and
the first and second fast axes are oriented along a pointing direction; and
the third fast axis is reconfigurable by the first electrical signal to adopt either a first orientation or a second orientation, the first orientation being along or orthogonal to the pointing direction, the second orientation having a 45° or −45° offset from the first orientation.

4. The device of claim 3, wherein each of the first axis, the second axis, the first orientation and the second orientation deviates from an intended orientation by at most 2°.

5. The device of claim 1, wherein:
the at least one electrical signal consists of a first electrical signal and a second electrical signal;
the at least one FLC HWP consists of a first FLC HWP and a second FLC HWP serially cascaded together;
the first QWP has a first fast axis, the second QWP has a second fast axis, the first FLC HWP has a third fast axis, and the second FLC HWP has a fourth fast axis;
the first and second fast axes are oriented along a pointing direction;
the third fast axis is reconfigurable by the first electrical signal to adopt either a first orientation or a second orientation, the first orientation being along or orthogonal to the pointing direction, the second orientation having a 45° or −45° offset from the first orientation;
the fourth fast axis is reconfigurable by the second electrical signal to adopt either a third orientation or a fourth orientation, the third orientation being along or orthogonal to the pointing direction, the fourth orientation having a 45° or −45° offset from the third orientation; and
the first and second electrical signals are synchronized such that:

(a) to cause the second polarization orientation to be orthogonal to the first polarization orientation over a duration divided into a first half duration and a second half duration, the first electrical signal configures the first FLC HWP to adopt the first orientation over the first half duration and the second orientation over the second half duration while the second electrical signal configures the second FLC HWP to adopt the fourth orientation over the first half duration and the third orientation over the second half duration; and (b) to cause the second polarization orientation to be same as the first polarization orientation over the duration, the first electrical signal configures the first FLC HWP to adopt the first orientation over the first half duration and the second orientation over the second half duration while the second electrical signal configures the second FLC HWP to adopt the third orientation over the first half duration and the fourth orientation over the second half duration.

6. The device of claim 5, wherein:
the first and second electrical signals are synchronized to be mutually out-of-phase so as to cause the second polarization orientation to be orthogonal to the first polarization orientation; and
the first and second electrical signals are synchronized to be in-phase so as to cause the second polarization orientation to be same as the first polarization orientation.

7. The device of claim 5, wherein:
each of the first and second electrical signals over the duration is a bipolar signal symmetrical with respect to zero volt and having an amplitude transition at a mid-point of the duration, causing each of the first and second FLC HWPs to be driven with a zero DC voltage averaged over the duration.

8. The device of claim 5, each of the first axis, the second axis, and the first to fourth orientations deviates from an intended orientation by at most 2°.

9. A beam-steering apparatus for deflecting an incident linearly-polarized (LP) light beam by a selected angle from an incident direction, the apparatus comprising:
a front-end quarter-wave plate (QWP) for transforming the incident LP light beam to an incident CP light beam;
plural beam-deflecting units serially cascaded together such that the incident CP light beam is successively deflected during traveling over the beam-deflecting units, wherein each of the beam-deflecting units is realized as the device of claim 1; and
an electronic controller configured to determine and generate the at least one electrical signal for each of the beam-deflecting units such that the selected angle equals a sum of signed deflection angles each provided by an individual beam-deflection unit, wherein for the individual beam-deflection unit, the signed deflection angle has a magnitude given by the deflection angle and a sign determined according to the left or right side that is selected.

10. The beam-steering apparatus of claim 9, wherein in the individual beam-deflecting unit:
the at least one electrical signal consists of a first electrical signal;
the at least one FLC HWP consists of a first FLC HWP;
the first QWP has a first fast axis, the second QWP has a second fast axis, and the first FLC HWP has a third fast axis; and the first and second fast axes are oriented along a pointing direction; and the third fast axis is reconfigurable by the first electrical signal to adopt either a first orientation or a second orientation, the first orientation being along or orthogonal to the pointing direction, the second orientation having a 45° or −45° offset from the first orientation.

11. The beam-steering apparatus of claim 9, wherein in the individual beam-deflecting unit:

the at least one electrical signal consists of a first electrical signal and a second electrical signal;

the at least one FLC HWP consists of a first FLC HWP and a second FLC HWP serially cascaded together;

the first QWP has a first fast axis, the second QWP has a second fast axis, the first FLC HWP has a third fast axis, and the second FLC HWP has a fourth fast axis;

the first and second fast axes are oriented along a pointing direction;

the third fast axis is reconfigurable by the first electrical signal to adopt either a first orientation or a second orientation, the first orientation being along or orthogonal to the pointing direction, the second orientation having a 45° or −45° offset from the first orientation;

the fourth fast axis is reconfigurable by the second electrical signal to adopt either a third orientation or a fourth orientation, the third orientation being along or orthogonal to the pointing direction, the fourth orientation having a 45° or −45° offset from the third orientation; and the first and second electrical signals are synchronized such that:

(a) to cause the second polarization orientation to be orthogonal to the first polarization orientation over a duration divided into a first half duration and a second half duration, the first electrical signal configures the first FLC HWP to adopt the first orientation over the first half duration and the second orientation over the second half duration while the second electrical signal configures the second FLC HWP to adopt the fourth orientation over the first half duration and the third orientation over the second half duration; and (b) to cause the second polarization orientation to be same as the first polarization orientation over the duration, the first electrical signal configures the first FLC HWP to adopt the first orientation over the first half duration and the second orientation over the second half duration while the second electrical signal configures the second FLC HWP to adopt the third orientation over the first half duration and the fourth orientation over the second half duration.

12. The beam-steering apparatus of claim 11, wherein in the individual beam-deflecting unit:

the first and second electrical signals are synchronized to be mutually out-of-phase so as to cause the second polarization orientation to be orthogonal to the first polarization orientation; and the first and second electrical signals are synchronized to be mutually in-phase so as to cause the second polarization orientation to be same as the first polarization orientation.

13. The beam-steering apparatus of claim 11, wherein in the individual beam-deflecting unit:

each of the first and second electrical signals over the duration is a bipolar signal symmetrical with respect to zero volt and having an amplitude transition at a mid-point of the duration, causing each of the first and second FLC HWPs to be driven with a zero DC voltage averaged over the duration.

14. A system for projecting an image comprising:

an image generator for generating the image in linearly-polarized (LP) light; and the beam-steering apparatus of claim 9 for deflecting the image.

15. The system of claim 14, wherein the image generator comprises:

a light source for generating LP light;

a passive diffractive optical element (DOE) module for generating the image upon illuminated by the light source such that the image is carried in LP light; and a fine steerer located between the passive QWP and the passive DOE module for additionally deflecting the image carried in CP light, the fine steerer having a steering angle range narrower than a steering angle range provided by the beam-steering apparatus so that the beam-steering apparatus increases a field of view (FOV) provided by the system in comparison to using the fine steerer alone.

16. The system of claim 15, wherein the passive DOE module is a Dammann grating.

17. The system of claim 15, wherein the fine steerer is a liquid prism or an optical phased array.

18. The system of claim 14, wherein the image generator comprises:

a light source for generating LP light; and a spatial light modulator (SLM) for generating and steering the image upon illuminated by the light source such that the image is carried in LP light and is changeable by programming the SLM, wherein the SLM has a steering angle range narrower than a steering angle range provided by the beam-steering apparatus so that the beam-steering apparatus increases a field of view (FOV) provided by the system in comparison to using the SLM alone.

19. The system of claim 18, wherein the SLM is a liquid crystal on silicon (LCoS).

20. The system of claim 18, wherein the SLM is a digital micromirror device (DMD).

* * * * *